US008564679B2

(12) United States Patent
Ono

(10) Patent No.: US 8,564,679 B2
(45) Date of Patent: Oct. 22, 2013

(54) IMAGE PROCESSING APPARATUS, IMAGE PROCESSING METHOD AND PROGRAM

(75) Inventor: Hiroaki Ono, Kanagawa (JP)

(73) Assignee: Sony Corporation, Tokyo (JP)

( * ) Notice: Subject to any disclaimer, the term of this patent is extended or adjusted under 35 U.S.C. 154(b) by 874 days.

(21) Appl. No.: 11/780,904

(22) Filed: Jul. 20, 2007

(65) Prior Publication Data

US 2008/0024619 A1 Jan. 31, 2008

(30) Foreign Application Priority Data

Jul. 27, 2006 (JP) .............................. P2006-204319

(51) Int. Cl.
*H04N 5/228* (2006.01)
(52) U.S. Cl.
USPC ........ 348/222.1; 348/169; 348/161; 348/155; 348/170; 348/172
(58) Field of Classification Search
USPC ........... 348/161, 155, 169–172, 152; 382/107
See application file for complete search history.

(56) References Cited

U.S. PATENT DOCUMENTS

| 7,436,887 | B2 * | 10/2008 | Yeredor et al. ............ 375/240.01 |
| 7,643,055 | B2 * | 1/2010 | Uebbing ........................ 348/155 |
| 2002/0072134 | A1 * | 6/2002 | Ha et al. ........................... 438/14 |
| 2003/0151672 | A1 * | 8/2003 | Robins et al. ............. 348/208.6 |
| 2004/0240744 | A1 * | 12/2004 | Honda et al. .................. 382/236 |
| 2005/0052553 | A1 * | 3/2005 | Kido et al. .................... 348/296 |
| 2005/0264679 | A1 * | 12/2005 | Sasaki et al. .................. 348/345 |
| 2006/0007327 | A1 * | 1/2006 | Nakamura et al. ............ 348/239 |
| 2006/0115297 | A1 * | 6/2006 | Nakamaru .................... 399/163 |
| 2006/0181627 | A1 * | 8/2006 | Farrier .......................... 348/308 |
| 2006/0198611 | A1 * | 9/2006 | Park .............................. 386/107 |
| 2006/0274955 | A1 * | 12/2006 | Honda et al. .................. 382/236 |
| 2007/0189728 | A1 * | 8/2007 | Yu ................................. 386/107 |
| 2008/0122927 | A1 * | 5/2008 | Konno et al. ................. 348/143 |

FOREIGN PATENT DOCUMENTS

| JP | 10-290450 | 10/1998 |
| JP | 2001-042391 | 2/2001 |
| JP | 2003-259184 | 9/2003 |
| JP | 2006-040199 | 2/2006 |

OTHER PUBLICATIONS

Office Action from Japanese Patent Office for Japanese Patent Application No. 2006-204319 dated Apr. 5, 2011.
Office Action from Japanese Patent Office for Japanese Patent Application No. 2006-204319 dated Feb. 28, 2012 (5 pages).

* cited by examiner

*Primary Examiner* — Tuan Ho
*Assistant Examiner* — Antoinette Spinks
(74) *Attorney, Agent, or Firm* — Finnegan, Henderson, Farabow, Garrett & Dunner, L.L.P.

(57) ABSTRACT

An image processing apparatus includes: an object state detector detecting a state of an object in input images inputted in time series; an image-capturing controller controlling image-capturing of the input images in accordance with the detected state of an object; and an image combiner combining pixel values at corresponding pixel positions of the input images, and outputting the pixel values as an output image, the input images being subjected to image-capturing control by the image-capturing controller.

13 Claims, 13 Drawing Sheets

IMAGE PROCESSING APPARATUS, IMAGE PROCESSING METHOD AND PROGRAM

This application is a divisional of U.S. patent application Ser. No. 10/061,183, filed Feb. 4, 2002, which is based upon and claims the benefit of priority from Japanese Applications 2001-107131 filed Apr. 5, 2001, and 2001-182982 filed on Jun. 18, 2001. The entire contents of each of these applications are incorporated herein by reference.

BACKGROUND OF THE INVENTION

1. Field of the Invention

The present invention relates to an image processing apparatus. Specifically, the present invention relates to an image processing apparatus that displays a trajectory of captured images taken in time series, and to an image processing method thereof, as well as a program that causes a computer to execute such a method.

2. Description of Related Art

There is proposed a method of creating an image indicating a trajectory of a moving object (hereinafter referred to as a "trajectory composite image") from a plurality of captured images taken in time series (hereinafter referred to as "frame images"). In such a method (for example, see Japanese Patent Application Publication No. Hei 10-290450, FIG. 1), single composite still image is generated by extracting a plurality of frame images from video data and weighting in accordance with their luminance values.

SUMMARY OF THE INVENTION

In the above related art, pixels of identical position in the respective frame image are combined by greatly weighting a pixel, whose distance from an average value of luminance values is equal to or greater than the variance of the luminance values, and lightly weighting a pixel, whose distance from the average value is less than the variance. The result is then outputted as the pixel of identical position in an output image.

With the related art, however, a user has to set in advance an image-capturing interval and exposure time in order to continuously capture frame images. In an image capturing apparatus that can create and reproduce the trajectory of a moving object, it is difficult for the user to determine optimum image-capturing interval and exposure time for creating the trajectory of the moving object. Hence, there may arise the following disadvantages. In other words, if the image-capturing interval is set too long, trajectory points in the trajectory image of the moving object are too separated, making it difficult to recognize the trajectory. If the exposure time is too long, blurring of the moving object becomes too large, making it difficult to recognize the trajectory.

Accordingly, it is desirable to provide an optimum image-capturing control for displaying a trajectory composite image in consideration of a motion of an object in frame images. The present invention is made in view of the above.

In an aspect of the present invention, there is provided an image processing apparatus including object state detecting means for detecting a state of an object in input images inputted in time series; image-capturing control means for controlling image-capturing of the input images in accordance with the detected state of an object; and image combining means for combining pixel values at corresponding pixel positions of the input images, and outputting the pixel values as an output image, the input images being subjected to image-capturing control by the image-capturing control means. Accordingly, the apparatus enables to realize a function of controlling the image-capturing of the input images to be combined in accordance with the state of the object.

The output image may be an image indicating a trajectory of the object.

The image combining means may include: image selecting means for selecting, as selection images, a predetermined number of input images from the input images; background creating means for creating, with respect to each of corresponding pixel positions of the selection images, a pixel value having a predetermined distribution in pixel values of the selection images, as a pixel value of a corresponding pixel position of a background image; background image holding means for holding pixel values of the background image; output image holding means for holding pixel values of the output image; degree-of-difference generating means for generating a degree-of-difference indicating a degree that the pixel values of the input images are different from the corresponding pixel values of the background image held by the background image holding means; and output image combining means for combining, with respect to the pixel values of the output image, pixel values at the corresponding pixel positions of the input images in accordance with the degree-of-difference, and holding as pixel values of a new output image in the output image holding means. The apparatus in the present aspect enables to achieve a function of updating the background image based on the input images inputted in time series, and generating the pixel values of the output image in accordance with the degree-of-difference from the pixel values of the input images.

In another aspect of the invention, the object state detecting means may detect a motion of the object as a state of the object; and the image-capturing control means calculate an image-capturing interval according to a speed of the detected motion of the object, and control the image-capturing based on the image-capturing interval. The apparatus in the present aspect enables to achieve a function of image-capturing at an optimum image-capturing interval in accordance with the state of the object. For example, the image-capturing control means may calculate the image-capturing interval such that it becomes shorter as the speed of the detected motion of the object becomes higher.

In still another aspect of the invention, the object state detecting means may detect a motion of the object as a state of the object, and the image-capturing control means may calculate exposure time according to a speed of the detected motion of the object, and control the image-capturing based on the exposure time. The apparatus in the present aspect enables to achieve a function of image-capturing at optimum exposure time according to the state of the object. For example, the image-capturing control means may calculate the exposure time such that it becomes shorter as the speed of the detected motion of the object becomes higher.

In still another aspect of the invention, the object state detecting means may detect a motion of the object as a state of the object; and the image-capturing control means may perform control such that the input image is captured if the object moves, and that the image-capturing of the input image is stopped if the object does not move. The apparatus in the present aspect enables to achieve a function of image-capturing input images as long as the object moves.

In still another aspect of the invention, there may be further provided with start detecting means for detecting a designation of an image-capturing start position of the input images. The image-capturing control means may perform control such that the input image is captured if the object moves after the image-capturing start position, and that the image-capturing of the input image is stopped if the object does not move.

The apparatus in the present aspect enables to achieve a function of image-capturing input images as long as the object moves after a designated image-capturing start position.

In still another aspect of the invention, there may be further provided with end detecting means for detecting a designation of an image-capturing end position of the input image. The image-capturing control means may perform control such that the input image is captured if the object moves between the image-capturing start position and the image-capturing end position, and that the image-capturing of the input image is stopped if the object does not move. The apparatus in the present aspect enables to achieve a function of image-capturing input images as long as the object moves between a designated start position and a designated end position.

Thus, according to the present invention, the optimum image-capturing control for displaying a trajectory composite image can be realized in consideration of the motion of an object in frame images.

DETAILED DESCRIPTION OF EMBODIMENT

An embodiment of the present invention will be described below with reference to the accompanying drawings.

Figure 1:
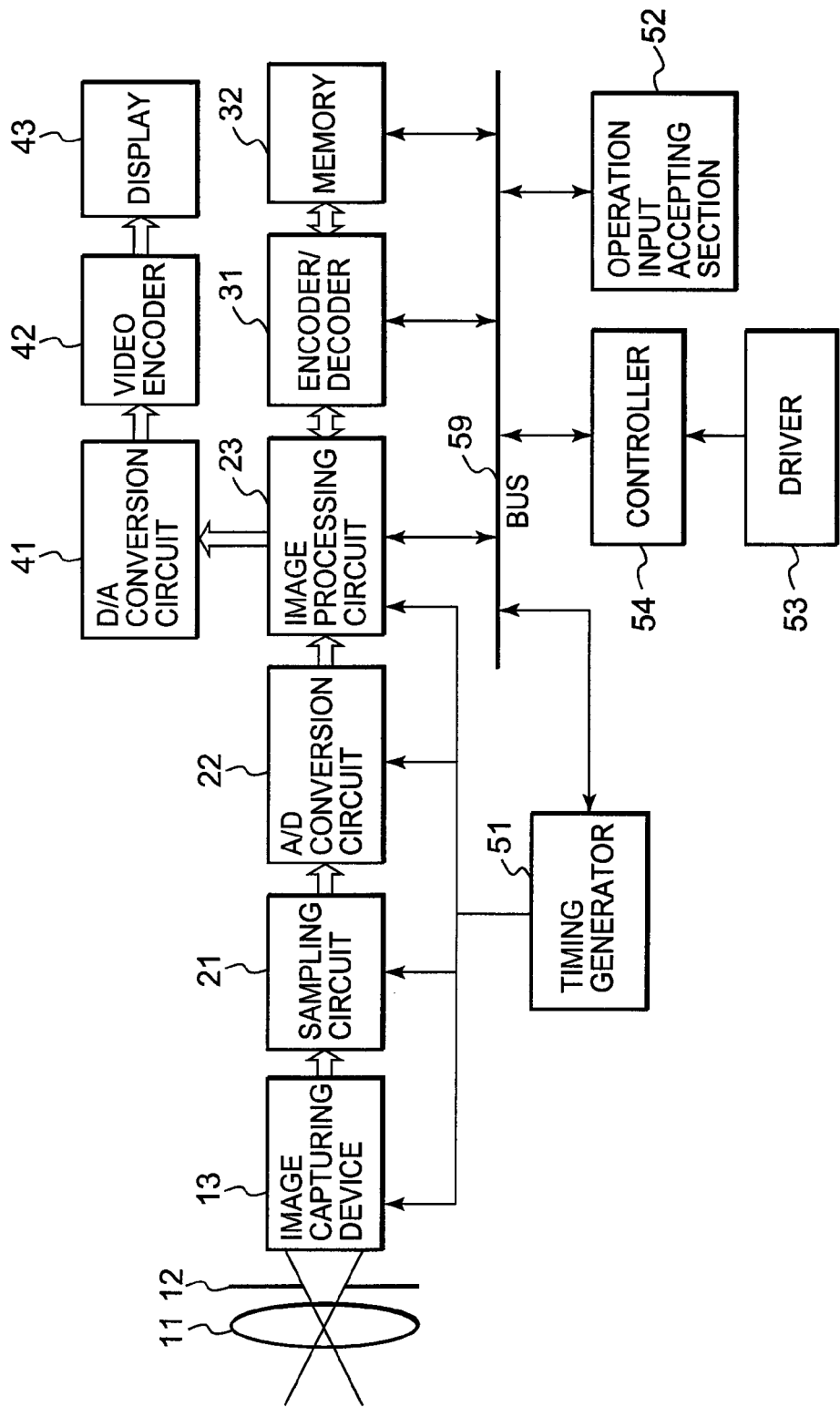
FIG. 1 is a diagram showing an example of configuration of an image capturing apparatus as an embodiment of an image processing apparatus in accordance with the present invention.

FIG. 1 is a diagram showing a configuration example of an image capturing apparatus as an embodiment of an image processing apparatus according to the present invention. The image capturing apparatus can be roughly divided into an optical system, a signal processing system, a recording system, a display system, and a control system.

The optical system includes a lens 11 for collecting optical images of an object, an iris 12 for adjusting the quantity of light of optical images, and an image capturing device 13 for photoelectrically converting a focused light image into an electronic signal. The image capturing device 13 can be realized by, for example, CCD (charge coupled devices), image sensors, or the like.

The signal processing system includes a sampling circuit 21 for sampling electrical signals from the image capturing device 13, an A/D conversion circuit 22 for converting an analog signal supplied from the sampling circuit 21 to a digital signal, and an image processing circuit 23 for performing a predetermined image processing of a digital signal inputted from the A/D conversion circuit 22. The sampling circuit 21 can be realized by, for example, correlated double sampling (CDS) circuit. The sampling circuit 21 enables to reduce noise occurred in the image capturing device 13. The details of processing performed by the image processing circuit 23 will be described later.

The recording system includes a memory 32 for storing image signals, and an encoder/decoder 31 which encodes an image signal processed by the image processing circuit 23, and stores it in the memory 32. The encoder/decoder 31 also reads and decodes the image signal from the memory 32, and supplies it to the image processing circuit 23.

The display system includes a D/A conversion circuit 41 for converting an image signal processed by the image processing circuit 23 to an analog image signal, a video encoder 42 for encoding the analog image signal to a video signal of a mode suite for a display 43 at the subsequent stage, and the display 43 for displaying an image corresponding to the video signal inputted. The display 43 can be realized by, for example, a LCD (liquid crystal display). The display 43 may also function as a finder.

The control system includes a timing generator 51 for controlling operation timings of the image capturing device 13, the sampling circuit 21, the A/D conversion circuit 22 and the image processing circuit 23, an operation input accepting section 52 for accepting shutter operation and other command inputs which are performed by a user, a driver 53 for connecting peripheral devices, and a controller 54 for controlling the whole of the image capturing apparatus. A magnetic disk, an optical disk, a magneto-optical disk, or a semiconductor memory is connected to the driver 53. The controller 54 reads via the driver 53 control programs stored therein, and performs control based on the read control programs, and commands inputted through the operation input accepting section 52 by a user.

The image processing circuit 23, the encoder/decoder 31, the memory 32, the timing generator 51, the operation input accepting section 52, and the controller 54 are connected to each other via a bus 59.

In the image capturing apparatus, an optical image (incident light) of an object is received through the lens 11 and the iris 12 to the image capturing device 13, and then subject to photoelectric conversion by the image capturing device 13, resulting in an electrical signal. After removing noise components from the obtained electrical signal by the sampling circuit 21, the signal is digitalized by the A/D conversion circuit 22, and temporarily stored in an image memory (not shown) contained in the image processing circuit 23.

In a normal state, it is arranged such that under the control of the signal processing system by the timing generator 51, an image signal is continuously overwritten at a constant frame rate in the image memory contained in the image processing circuit 23. The image signal of the image memory contained in the image processing circuit 23 is converted to an analog signal by the D/A conversion circuit 41, and then converted to a video signal by the video encoder 4, so that the corresponding image can be displayed on the display 43.

The display 43 also functions as a finder of the image capturing apparatus. When the user presses a shutter button included in the operation input accepting section 52, the controller 54 controls the signal processing system such that the timing generator 51 holds the image signal immediately after the shutter button is pressed, namely, no more image signal is overwritten in the image memory of the image processing circuit 23. The image data held by the image memory of the image processing circuit 23 is encoded by the encoder/decoder 31, and then stored in the memory 32. By the foregoing operations of the image capturing apparatus, the capture of image data per frame is thus completed.

Figure 2:
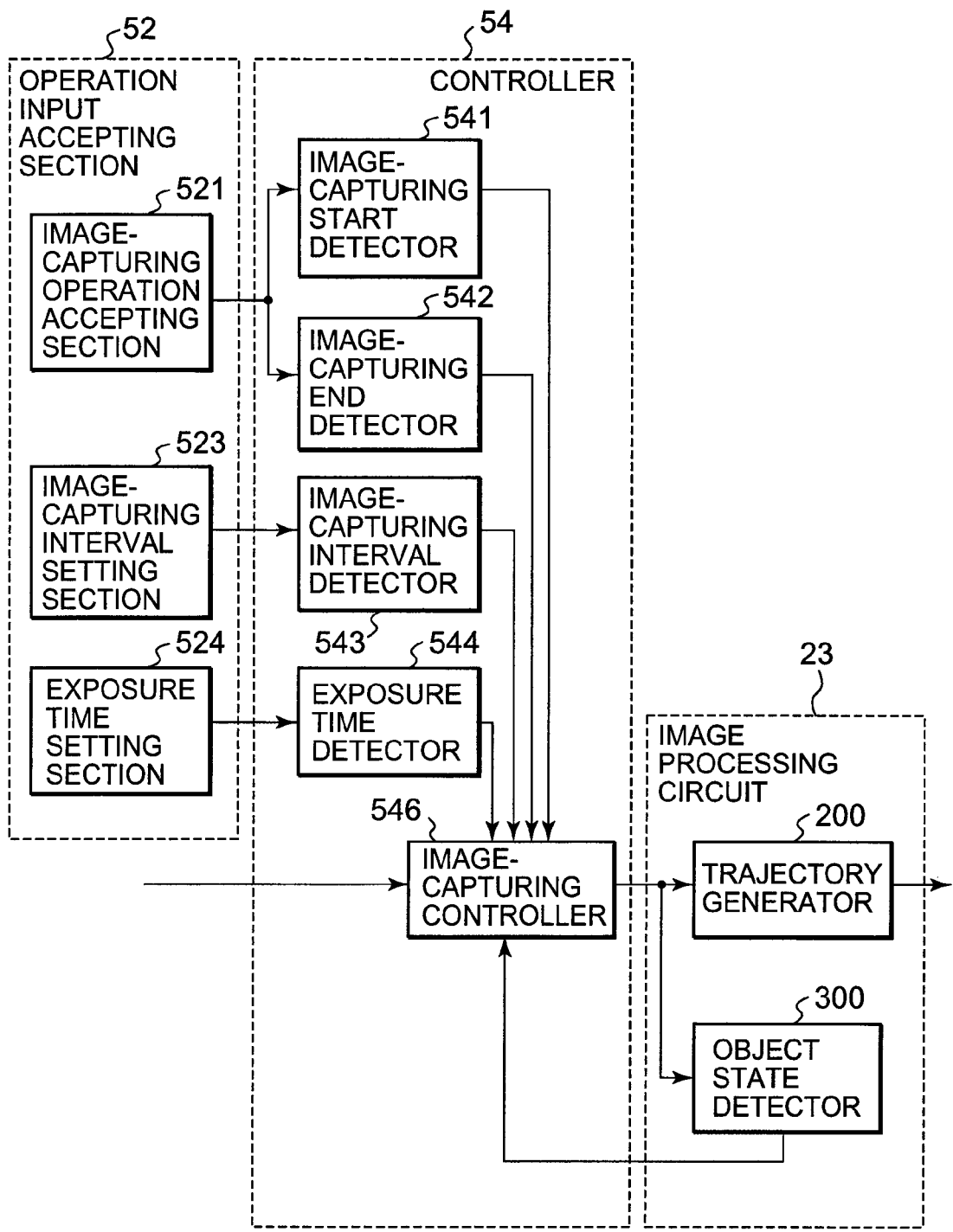
FIG. 2 is a diagram showing an example of peripheral configuration of a controller 54 of the image capturing apparatus of the present embodiment.

FIG. 2 is a diagram showing an example of the peripheral configuration of the controller 54 of the image capturing apparatus in the present embodiment. The controller 54 supplies an input image outputted from the A/D conversion circuit 22 or the encoder/decoder 31 to the image processing circuit 23, in accordance with an operation input accepted by the operation input accepting section 52, and outputs the result to the D/A conversion circuit 41 or the encoder/decoder 31 to the subsequent stage. The controller 54 has an image-capturing start detector 541, an image-capturing end detector 542, an image-capturing interval detector 543, and an exposure time detector 544. The operation input accepting section 52 has an image-capturing operation accepting section 521, an interval setting section 523, and an exposure time setting section 524, which accept the user's input on an image-capturing operation, an image-capturing interval, and exposure time. The image processing circuit 23 has a trajectory generator 200 for generating a trajectory composite image, and an object state detector 300 for detecting a state of an object to be image-captured.

The object state detector 300 detects the state of an object in an input image supplied from the image-capturing controller 546. The object state detector 300 calculates a vector (motion vector: optical flow) indicating a motion (a direction and an amount) of the object. When calculating the motion vector, the direction and the speed of motion of a moving object in image data will be calculated from continuous frames. In block matching which is known as a typical method thereof, the motion vector can be obtained by searching a pixel point in a certain frame and its new position after movement in the next frame. As the pixel point in this case, a characteristic point is often used from the viewpoint of ease in searching. The state of the object detected by the object state detector 300 is supplied to the image-capturing controller 546.

In the operation input accepting section 52, the image-capturing operation accepting section 521 accepts an image-capturing operation by the user. The section 521 corresponds to, for example, a shutter button of a digital still camera. In a continuous image-capturing mode, the image-capturing is repeated at constant intervals as long as the shutter button is being pressed. The image-capturing interval setting section 523 is for setting a time interval for each frame when image-capturing is in the continuous mode. The image-capturing interval can be set in advance by the user, or fixed by the image capturing apparatus. The exposure time setting section 524 is for setting exposure time for image-capturing. The term "exposure time" means a time period when an optical image is incident on the image capturing device 13.

In the controller 54, the image-capturing start detector 541 detects whether or not the start of image-capturing is instructed based on the image-capturing operation accepted by the image-capturing operation accepting section 521. The image-capturing end detector 542 detects whether or not the end of image-capturing is instructed based on an image-capturing operation accepted by the image-capturing operation accepting section 521. For example, in the normal continuous image-capturing mode, pressing the shutter button means the start of image-capturing, and releasing the pressed shutter button means the end of image-capturing.

The image-capturing interval detector 543 obtains the image-capturing interval set by the image interval setting section 523. The exposure time detector 544 obtains the exposure time set by the exposure time setting section 524.

The image-capturing controller 546 controls image-capturing of an input image outputted from the A/D conversion circuit 22 or the encoder/decoder 31. The image-capturing controller 546 performs control of capturing the input image in a time period from an image-capturing start position detected by the image-capturing start detector 541 to an image-capturing end position detected by the image-capturing end detector 542. At this time, the image-capturing controller 546 can control the image-capturing of the input image in response to the state of the object detected by the object state detector 300. For example, the input image may be captured as long as the object state detector 300 keeps detecting a movement of the object. It should be noted that, the number of images, which are continuously captured, can be given by dividing the period from the time position of the image-capturing start position to the time position of the image-capturing end position, by the image-capturing interval.

The image-capturing controller 546 also performs control for the continuous image-capturing based on the image-capturing interval obtained by the image-capturing interval detector 543. It is however not always easy for the user to set an appropriate image-capturing interval using the image-capturing interval setting section 523. Therefore, the image-capturing controller 546 calculates an image-capturing interval based on the state of an object detected by the object state detector 300, and controls the image-capturing operation based on the image-capturing interval. For example, the image-capturing interval may be set shorter as the speed of motion of an object detected by the object state detector 300 becomes higher. Alternatively, the image-capturing interval may be set longer as the speed of motion of an object becomes lower. In other words, if a long image-capturing interval is set for a fast-moving object, the trajectory per time may be scattered when the trajectory of the object is generated, thereby reducing visibility of the trajectory of the object.

In the image-capturing controller 546, an image-capturing interval i by time (for example, by second) can be calculated by the following equation:

$$i=(M_u/M_o) \times i_o$$

where $M_o$ is an amount of motion (size of motion vector) of an object detected by the object state detector 300, which is expressed by pixel unit, and $M_u$ is an amount of motion of an object in a trajectory on a trajectory image of a moving object set by a user, which is expressed by pixel unit. For example, if it is desired to obtain a trajectory image with the object motion step of 50 pixels, $M_u$ is set to 50. Furthermore, in the above equation, "$i_o$" indicates the image-capturing interval by time (for example, by second) for detecting the motion vector of an object.

The image-capturing controller 546 also controls image-capturing based on the exposure time obtained by the exposure time detector 544. It is however not always easy for the user to set the appropriate exposure time using the exposure time setting section 524. Therefore, the image-capturing controller 546 calculates the exposure time based on the state of an object detected by the object state detector 300, and controls the image-capturing operation based on the exposure time. For example, the exposure time may be set shorter as the speed of motion of an object detected by the object state detector 300 becomes higher, and the exposure time may be set longer as the speed of motion of an object becomes lower. In other words, the blur of a moving object is reduced as the exposure time becomes shorter, whereas too short exposure time may worsen a signal to noise ratio (S/N ratio). Consequently, the automatic calculation of exposure time in consideration of the balance between the maintaining of the S/N ratio and the suppression of the blur of the moving object benefits generation of the trajectory of the moving object.

The image-capturing interval and the exposure time thus calculated are supplied to the timing generator 51, and used to control the optical system and the signal processing system.

Figure 3A:
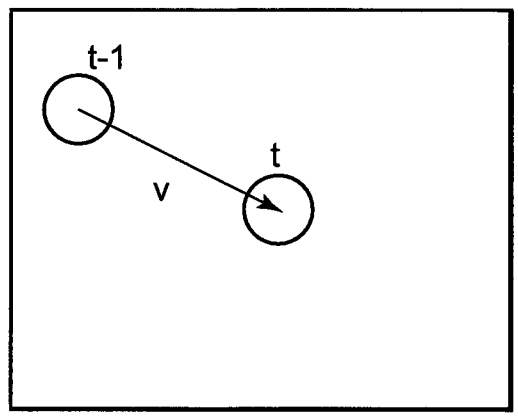
FIGS. 3A to 3C are diagrams showing examples of generation of a trajectory of the present embodiment.
Figure 3B:
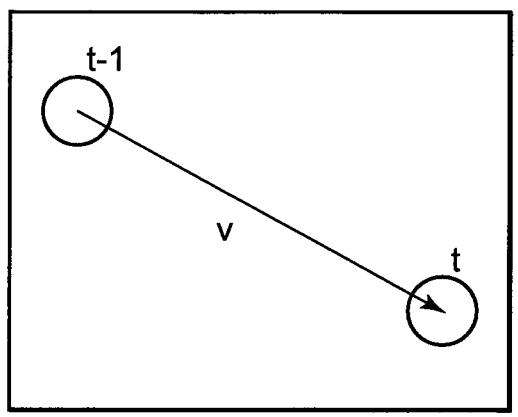
Figure 3C:
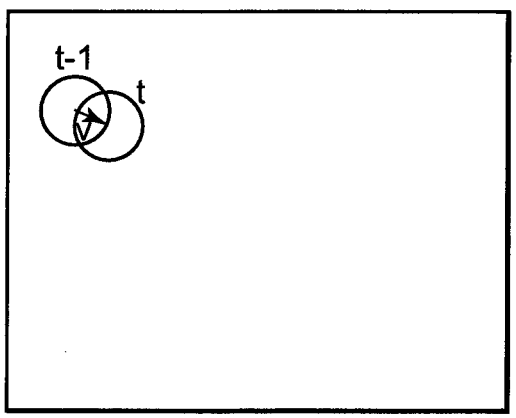

FIGS. 3A to 3C are diagrams showing examples of generation of a trajectory in the present embodiment, respectively. There are shown the trajectories of an object at time t−1 and time t. Vector v indicates the motion vector of a moving object in the transition from the time t−1 to the time t. The motion vector can be detected by using the object state detector 300.

When the motion vector in FIG. 3A is used as a reference, a large size of the motion vector as in FIG. 3B means that the object moves fast. In such a case, a shorter image-capturing interval than that in FIG. 3A may be used for making it easy for a user to view a trajectory composite image.

On the other hand, a smaller size of the motion vector as in FIG. 3C means that the object moves slowly. In this case, a longer image-capturing interval than that in FIG. 3A may be used for making it easy for a user to view a trajectory composite image.

Figure 4:
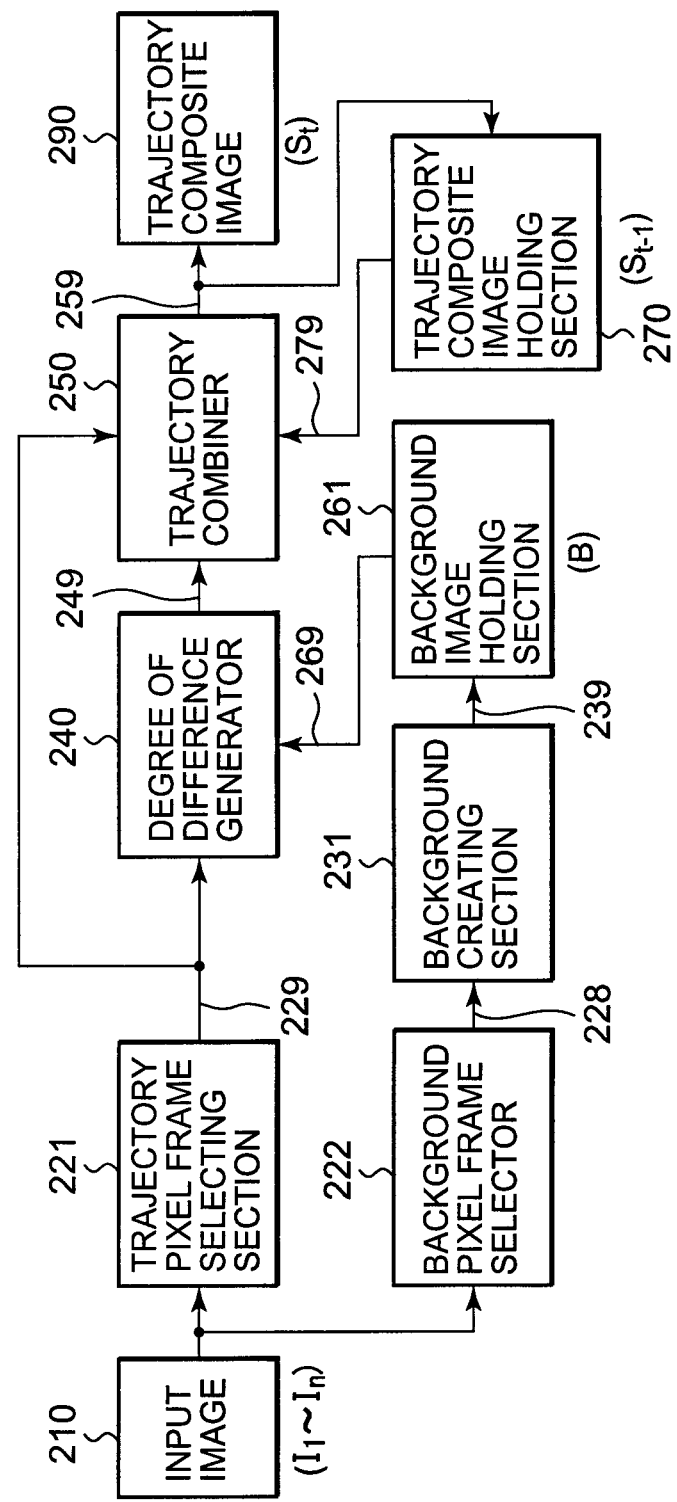
FIG. 4 is a diagram showing an example of configuration of an image processing circuit 23 of the image capturing apparatus of the present embodiment.

FIG. 4 is a diagram showing a configuration example of the image processing circuit 23 of the image capturing apparatus in the present embodiment. The image processing circuit 23 has a trajectory pixel frame selector 221, a background pixel frame selector 222, a background creating section 231, a background image holding section 261, a degree-of-difference generator 240, a trajectory combiner 250, and a trajectory composite image holding section 270. The image processing circuit 23 displays the state of a moving object in the course of its motion, as a plurality of trajectory composite images, assuming that n input images 210 are known in advance.

The background pixel frame selector 222 selects pixel values necessary for generating a background value from n pixel values at the corresponding pixel positions in input images 210 ($I_1$ to $I_n$), which are formed of n pieces of p×q pixels captured in time series. The selected frames are supplied in sequence through a signal line 228 to the background creating section 231.

The background pixel frame selector 222 can simplify the processing for generating a background value than the case of using all of the n pieces, by thinning and utilizing n pieces of the input images. For example, thinning the pixel values selected by the background pixel frame selector 222 to "n/10" can speed up the processing.

The background creating section 231 creates background values based on pixel values supplied through the signal line 228 to the background pixel frame selector 222. The background values created by the background creating section 231 are then supplied through a signal line 239 to the background image holding section 261.

The background image holding section 261 holds the background values supplied from the background creating section 231 through the signal line 239. The background values held by the background holding section 261 are then supplied through a signal line 269 to the degree-of-difference generator 240.

The trajectory pixel frame selector 221 selects n pixel values at corresponding pixel positions in the input images 210 ($I_1$ to $I_n$), which is formed of n pieces of p×q pixels captured in time series. Unlike the background pixel frame selector 222, the trajectory pixel frame selector 221 selects all of the input images without thinning.

The degree-of-difference generator 240 generates a degree-of-difference at each pixel position using a pixel value of the background image supplied from the background image holding section 261 through the signal line 269, and a pixel value of the frame supplied from the trajectory pixel frame selector 221 through the signal line 229. In other words, the degree-of-difference generator 240 generates p×q sets of degree-of-difference by calculating the distances between p×q sets of corresponding pixel values.

The trajectory composite image holding section 270 holds a trajectory composite image formed of p×q pixels. The trajectory composite image held by the trajectory composite image holding section 270 is then supplied through a signal line 279 to the trajectory combiner 250. The trajectory combiner 250 creates a new trajectory composite image $S_t$ (290) by combining the pixel value of a trajectory composite image $S_{t-1}$ supplied from the trajectory composite image holding section 270 through the signal line 279, and a pixel value of a frame $I_t$ supplied from the trajectory pixel frame selector 221 through the signal line 229. In other words, the trajectory combiner 250 causes the trajectory composite image holding section 270 to hold the current trajectory composite image by updating the trajectory composite image held in the trajectory composite image holding section 270 by using a new frame.

Figure 5:
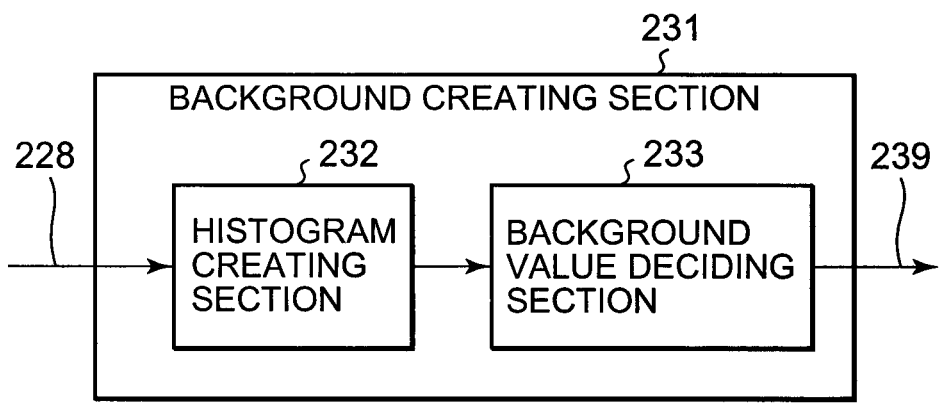
FIG. 5 is a diagram showing an example of configuration of a background creating section 231 of the image processing circuit 23 of the present embodiment.

FIG. 5 is a diagram showing a configuration example of the background creating section 231 of the image processing circuit 23 in the present embodiment. The background creating section 231 has a histogram creating section 232 and a background value deciding section 233.

Figure 6:
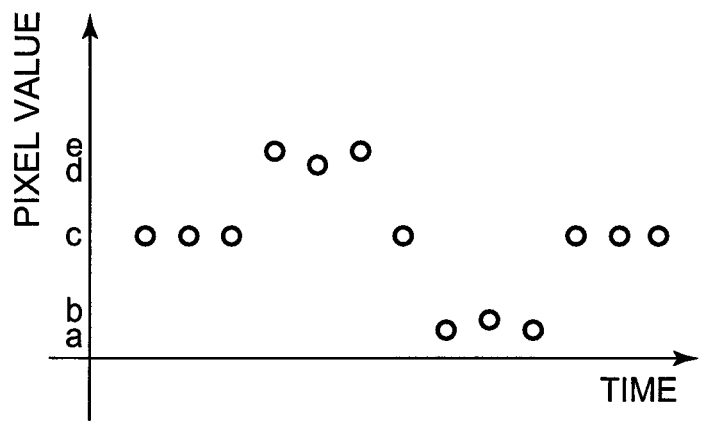
FIG. 6 is a diagram showing an example of pixel value distribution.
Figure 7:
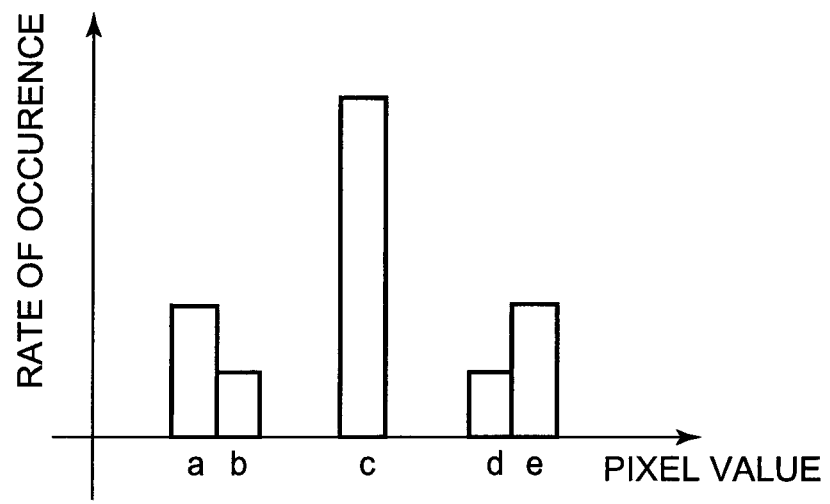
FIG. 7 is a diagram showing an example of histograms based on the pixel value distribution.

The histogram creating section 232 generates a histogram of n pixel values supplied from the background pixel frame selector 222 through the signal line 228. The histogram indicates a rate of occurrence with respect to the magnitude of a pixel value. For example, assuming the case where the pixel values have a distribution as shown in FIG. 6, the histogram thereof is as shown in FIG. 7. In other words, of 13 pixel values in FIG. 6, the rate of occurrence of a pixel value a is 2 times, that of a pixel value b is 1 time, that of a pixel value c is 7 times, that of a pixel value d is 1 time, and that of a pixel value e is 2 times. This leads to the histogram as shown in FIG. 7.

The histogram for the brightness is a one-dimensional histogram as shown in FIG. 7. A three-dimensional histogram is employed if the pixel values of RGB format are to be used. In other words, the dimension of histogram depends on a defined color space.

The background value deciding section 233 determines a background value based on the histogram created by the histogram creating section 232. Specifically, the background value deciding section 233 determines, as the background value, a pixel value having the highest rate of occurrence in the histogram. For example, in the example of FIG. 6, the pixel value c is the highest rate of occurrence and can be determined as the background value.

Figure 8:
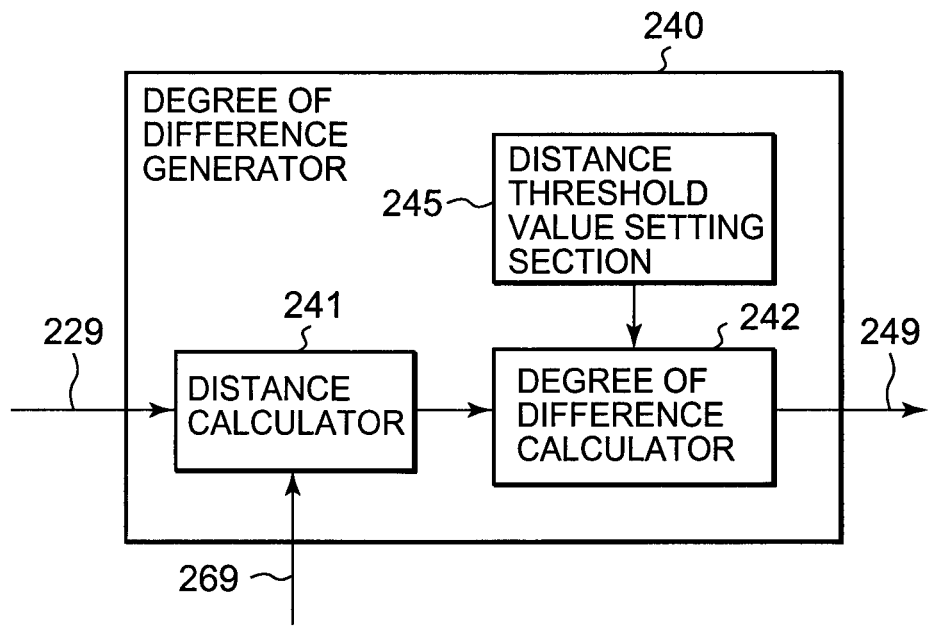
FIG. 8 is a diagram showing an example of configuration of a degree-of-difference generator 240 of the image processing circuit 23 in the present embodiment.

FIG. 8 is a diagram showing a configuration example of the degree-of-difference generator 240 of the image processing circuit 23 in the present embodiment. The degree-of-difference generator 240 has a distance calculator 241, a degree-of-difference calculator 242, and a distance threshold value setting section 245.

The distance calculator 241 calculates a distance between a background value supplied from the background image holding section 261 through the signal line 269, and a pixel value supplied from the trajectory pixel frame selector 221 through the signal line 229. The distance in this case means, for example, the distance in a color space, etc.

The degree-of-difference calculator 242 calculates a degree-of-difference between the background value and the pixel value of an input image, based on the distance calculated by the distance calculator 241. In other words, the degree-of-difference calculator 242 distinguishes a moving object and a background in the input image, and indicates that the two are different from each other in term of the degree-of-difference. The degree-of-difference can be calculated by, for example, assigning "1" to the moving object, and "0" to the background. When the two cannot be distinguished completely, a middle value may be employed.

When calculating the degree-of-difference, the degree-of-difference calculator 242 uses a threshold value of distance (a distance threshold value) for distinguishing the moving object from the background, in consideration of an error due to image quality. In other words, if the distance between the background value and the pixel value of the input image is within the distance threshold value, the two are considered as not being completely distinguishable. If the distance exceeds the distance threshold value, the two are considered as being completely distinguishable. As a result, for example, if the distance between the background value and the pixel value of the input image exceeds the distance threshold value, the maximum value of "1" can be calculated as the degree-of-difference. If the distance is within the distance threshold value, the degree-of-difference can be calculated as to be proportional to the distance. The distance threshold value is set in advance in the distance threshold value setting section 245.

Figure 9:
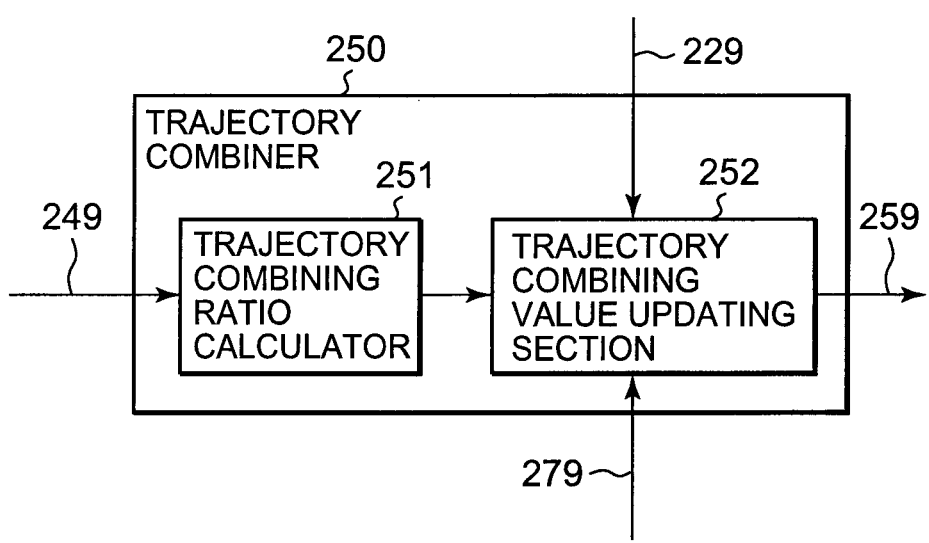
FIG. 9 is a diagram showing an example of configuration of a trajectory combiner 250 of the image processing circuit 23 in the present embodiment.
Figure 10A:
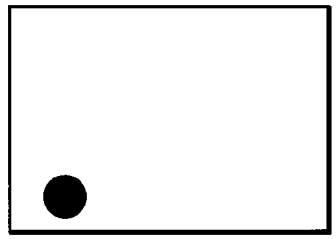
FIG. 10 is a diagram showing an example of input images.
Figure 10B:
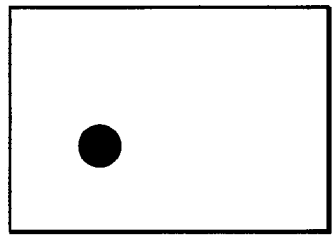
Figure 10C:
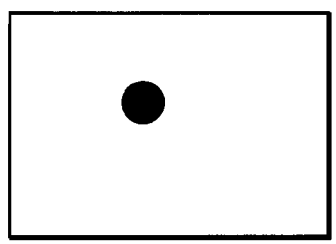
Figure 10D:
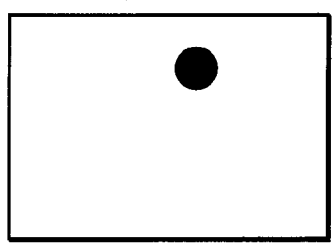
Figure 10E:
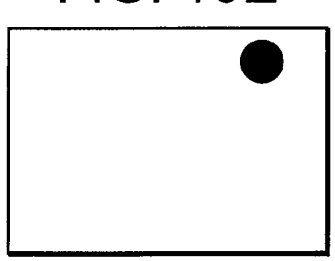
Figure 11A:
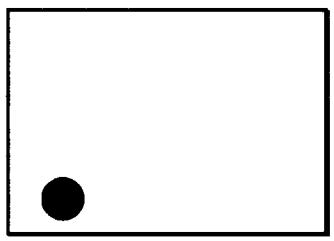
FIG. 11 is a diagram showing an example of frames in a trajectory composite moving image.
Figure 11B:
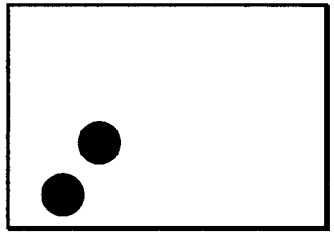
Figure 11C:
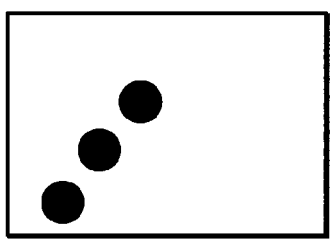
Figure 11D:
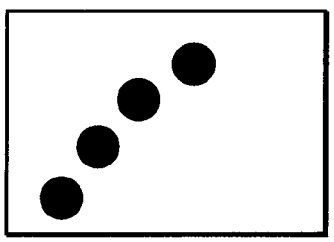
Figure 11E:
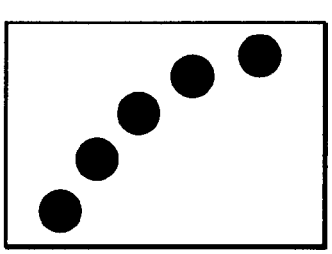
Figure 12A:
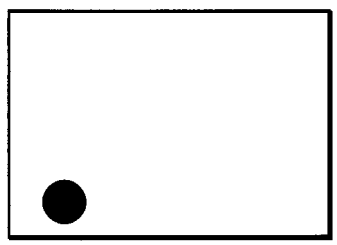
FIG. 12 is a diagram showing another example of the frames in the trajectory composite moving image.
Figure 12B:
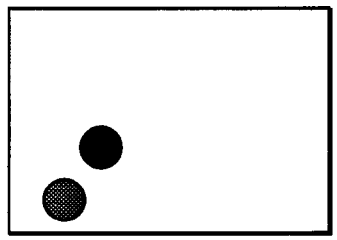
Figure 12C:
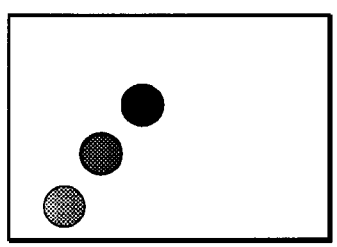
Figure 12D:
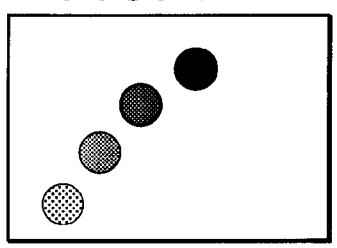
Figure 12E:
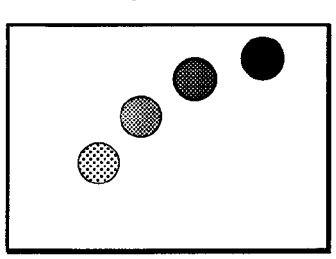

FIG. 9 is a diagram showing an configuration example of the trajectory combiner 250 of the image processing circuit 23 in the present embodiment. The trajectory combiner 250 has a trajectory combining ratio calculator 251 and a trajectory combining value updating section 252.

The trajectory combining ratio calculator 251 generates a combining ratio of trajectory combining (a trajectory combining ratio β) based on the degree-of-difference supplied from the degree-of-difference generator 240 through a signal line 249. The following is a specific method of calculating the trajectory combining ratio β. For example, when the difference between the pixel value of a frame $I_t$ and a background image $B_{t-1}$ is large, it is possible to determine a trajectory combining ratio such that contribution of the pixel value in the frame $I_t$ becomes larger. By so doing, a region having a greater difference from the background has a higher ratio of contribution to the trajectory combining value, thus enabling a clearer trajectory of the moving object to be obtained.

Based on the trajectory combining ratio β generated by the trajectory combining ratio calculator 251, the trajectory combining value updating section 252 updates the trajectory composite image supplied from the trajectory composite image holding section 270 through the signal line 279, by using the frame supplied from the trajectory pixel frame selector 221 through the signal line 229.

On the assumption that the pixel value of the frame $I_t$ in a coordinate (x, y) is I(x, y, t), and the pixel value of a trajectory composite image $S_{t-1}$ is S(x, y, t−1), a pixel value S of a new trajectory composite image $S_t$ can be obtained by the following equation.

$$S(x,y,t) = \beta \times I(x,y,t) + (1-\beta) \times S(x,y,t-1)$$

The trajectory combining value updating section 252 performs the processing of the above equation with respect to all pixels.

As another method of trajectory combining, it is possible to calculate the trajectory combining ratio by using two types of calculation rules based on the degree-of-difference. In other words, the calculation rule for the trajectory combining ratio in a background region having a small degree-of-difference is separated from the calculation rule for a moving object region having a large degree-of-difference, and a certain degree of a trajectory combining ratio is given even in the case of the small degree-of-difference. By so doing, the ratio of contribution of the background region becomes higher as the moving object region gets older. This enables the moving object trajectory to be seen as it is being faded out. In other words, it is possible that the latest trajectory is clear, and with time, the trajectory blends itself into the background and then fades out.

For example, in a case of combining five frames as shown in FIG. 10, if it is desired to have a clear trajectory as shown in FIG. 11, the result can be obtained by assigning, as the trajectory combining ratio β, "1" to the moving object region having a large degree-of-difference, and "0" to the background region having a small degree-of-difference. On the other hand, if it is desired to have a fading-out trajectory as shown in FIG. 12, the result can be obtained by assigning, as the trajectory combining ratio β, "1" to the moving object region, and "approximately 0.3 to 0.5" to the background region.

Figure 13A:
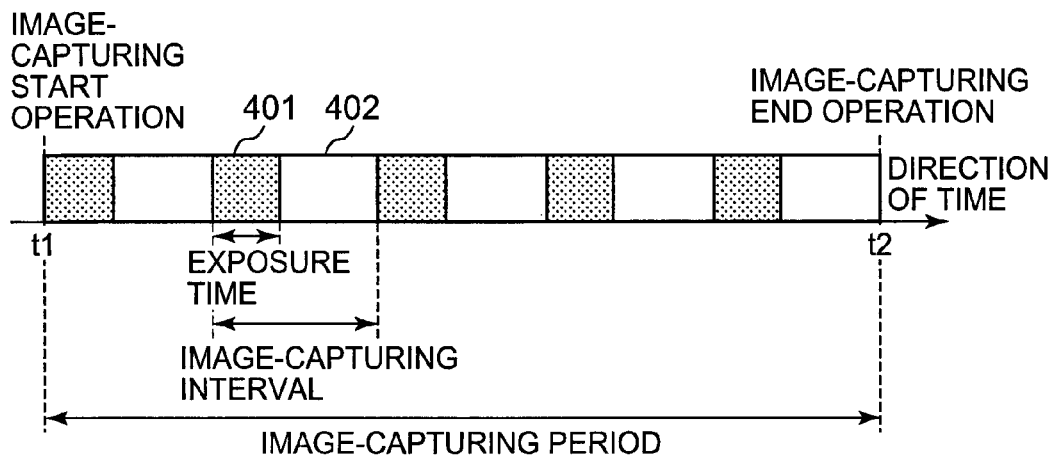
FIGS. 13A to 13C are diagrams showing examples of image-capturing control by an image-capturing controller 546 in the present embodiment.
Figure 13B:
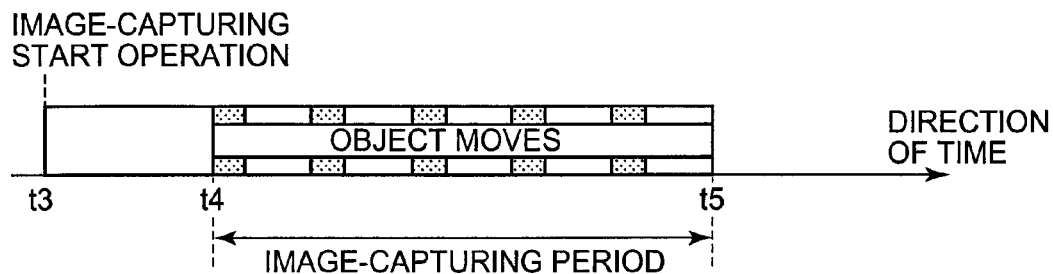
Figure 13C:
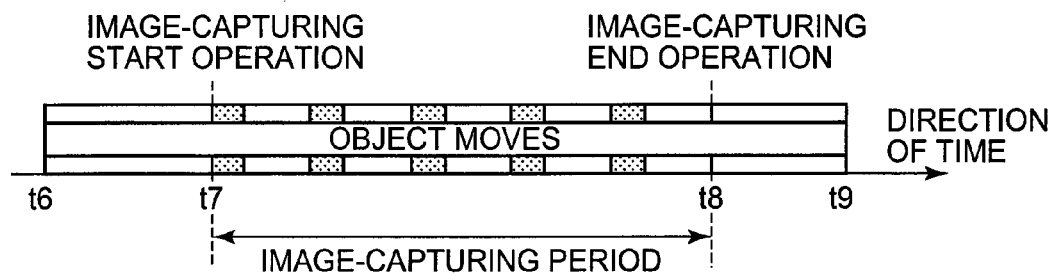

FIGS. 13A to 13C are diagrams showing examples of image-capturing control by the image-capturing controller 546 in the present embodiment. Specifically, FIG. 13A shows an example where the operation input accepting section 52 accepts an image-capturing start position, an image-capturing end position, an image-capturing interval, and exposure time which are designated by a user, and image-capturing control is carried out in accordance with these parameters. In this case, an image-capturing period is a period from time t1 of the designated image-capturing start position to time t2 of the designated image-capturing end position. In the image-capturing period, continuous image-capturing is performed based on an image-capturing interval 402 and exposure time 401. The number of images taken in the continuous image-capturing can be obtained by dividing the image-capturing period by the image-capturing interval 402. The exposure time 401 is allowed to set only to a value equal to the image-capturing interval 402 or less.

FIG. 13B shows a case where the operation input accepting section 52 accepts only the image-capturing start position, and the image-capturing interval, exposure time and image-capturing period are automatically calculated based on the motion vector of an object detected by the object state detector 300. In this case, it is determined that the object is moving during a period where the size of the motion vector of the object is greater than a predetermined size, and image-capturing is performed only in that period. In other words, image-capturing is performed only in the period when the object moves after time t3 of the image-capturing start position designated by the user (the period from time t4 to time t5), and the image-capturing is automatically terminated at a point where the state of the object is changed from in motion to still. Also in this case, the optimum image-capturing interval and exposure time for generating a trajectory of motion of the moving object can be calculated based on the motion vector of the object detected by the object state detector 300, as described above.

FIG. 13C shows a case where the motion of an object and image-capturing control are operated in conjunction with each other. In this case, the operation input accepting section 52 accepts the image-capturing start position and image-capturing end position. Subsequently, the image-capturing interval, exposure time and image-capturing period are automatically calculated based on the motion vector of the object detected by the object state detector 300. If the image-capturing start position and the image-capturing end position are included in a period where the object moves (the period from time t6 to time t9), the image-capturing period is between time t7 of the image-capturing start position and time t8 of the image-capturing end position. If the time of the image-capturing start position is outside the period where the object moves, a position where the object starts to move becomes the start position of the image-capturing period. If the time of the image-capturing end position is outside the period where the object moves, a position where the object stops becomes the end position of the image-capturing period.

Figure 14:
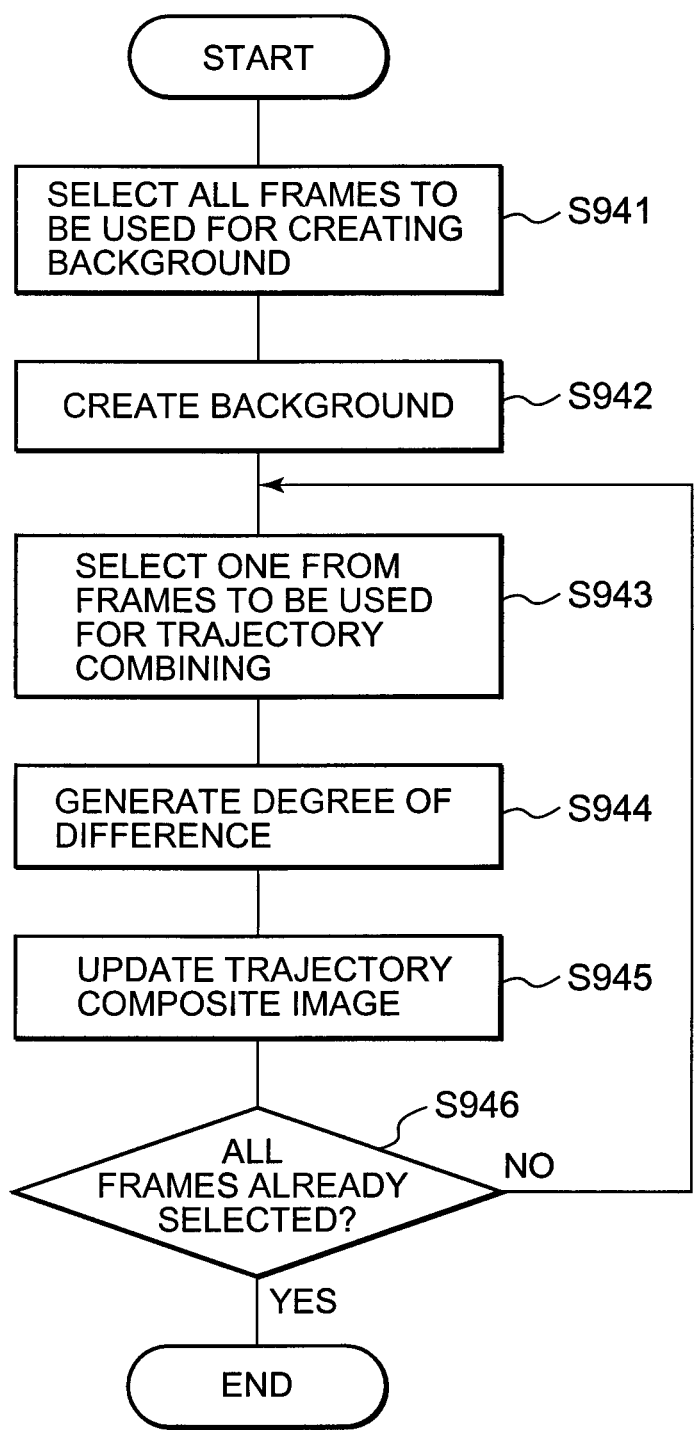
FIG. 14 is a flowchart showing an example of the processing procedure by the image processing circuit 23 of the image capturing apparatus in the present embodiment.

FIG. 14 is a flowchart showing an example of the processing procedure by the image processing circuit 23 of the image capturing apparatus in the present embodiment.

First, all of frames to be used for creating the background are selected (step S941). The background pixel frame selector 222 performs this processing. The selected frames are then used to create the background (step S942). The background creating section 231 performs this processing.

Next, a frame to be used for trajectory combining is selected as an input image (step S943). The trajectory pixel frame selector 221 performs this processing. A degree-of-difference between the background image and the input image is obtained (step S944). The degree-of-difference generator 240 performs this processing.

Based on the degree-of-difference, the trajectory composite image is updated (step S945). The trajectory combiner 250 performs this processing.

If all of the frames used for the trajectory combining have been selected, the procedure is terminated. If not, the processing of step S943 and the subsequent steps are repeated (step S946).

Thus, according to the present embodiment, the optimum image-capturing control for creating the trajectory composite image can be performed by having the image-capturing controller 546 and reflecting thereto the state of the object detected by the object state detector 300.

In the present embodiment has described with the example having the configuration that the background image is created at the time of (particularly, immediately before) creating the trajectory composite image. Alternatively, the background image created in advance may be used. For example, like a modification shown in FIG. 15, the background image, which is held by the background image holding section 261 and then supplied to the degree-of-difference generator 240, may be stored in the background image storing section 206. Thereafter, when creating the trajectory composite image, without creating any background image by the background creating section 231, the background image stored in the background image storing section 206 is decoded, and then the decoded result is held in the background image holding section 261.

Accordingly, when a plurality of the trajectory composite image are being created for the same input images, the creation of the background image can be omitted. Typically, calculation costs for creating the background image is higher than the case of creating the trajectory composite image, and therefore the effect of the omission thereof is high. For example, this is effective in the cases where after storing a plurality of frames obtained by continuous image-capturing, a trajectory composite image, and a background image, the display 43 reproduces a trajectory moving picture of a target scene.

Figure 15:
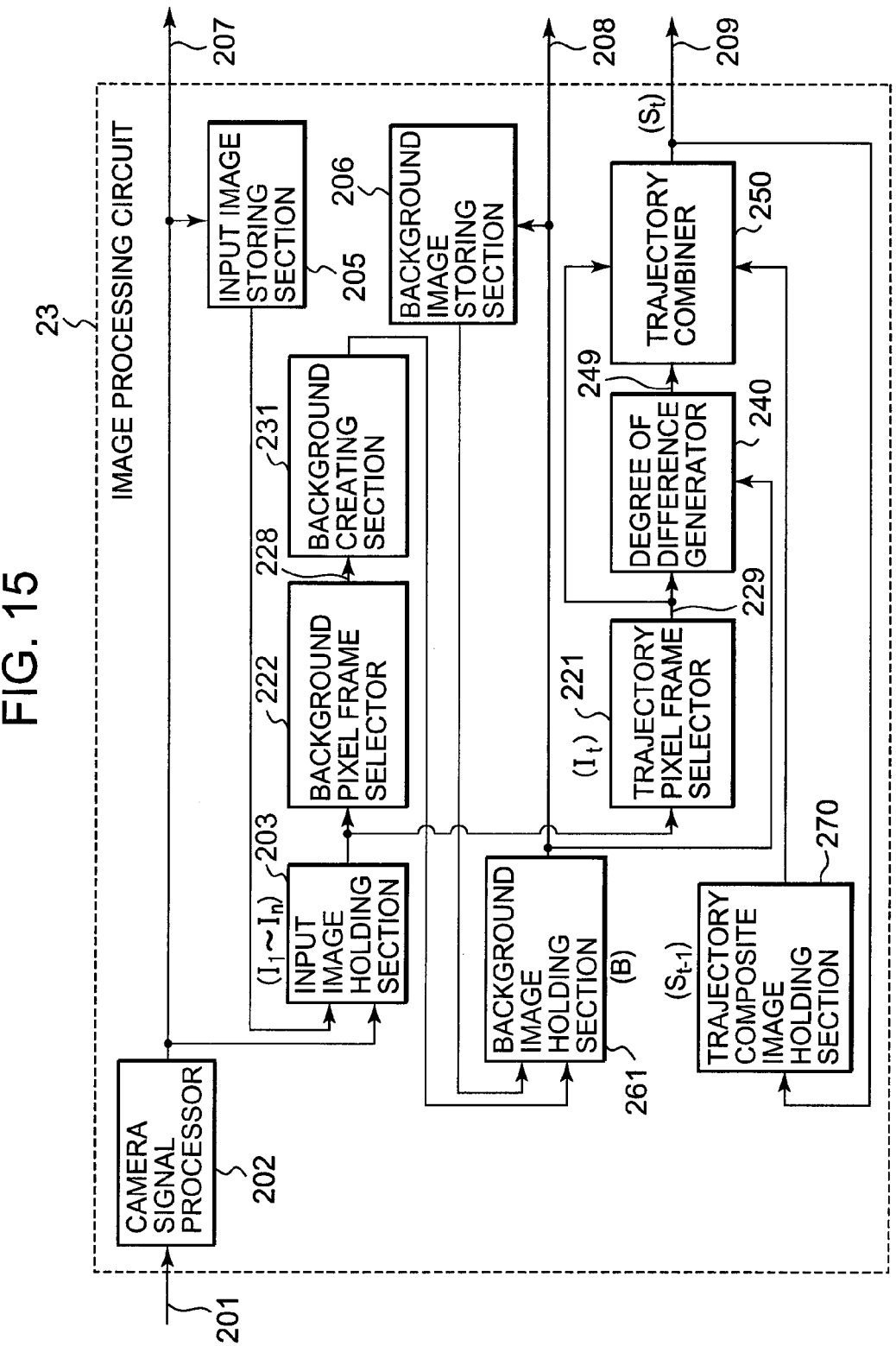
FIG. 15 is a diagram showing a modification of the image processing circuit 23 of the image capturing apparatus in the present embodiment.

In FIG. 15, the configurations and the operations of the trajectory pixel frame selector 221, the background pixel frame selector 222, the background creating section 231, the background image holding section 261, the degree-of-difference generator 240, the trajectory combiner 250, and the trajectory composite image holding section 270 are identical to that of the example in FIG. 4. In the example of FIG. 15, it is assumed that the image processing circuit 23 receives an input image supplied from the A/D conversion circuit 22 through a signal line 201, and the input image, the background image and the trajectory composite image are supplied through signal lines 207, 208 and 209, respectively, to the D/A conversion circuit 41 and the encoder/decoder 31, each being at the subsequent stage.

A camera signal processor 202 performs RGB synchronization processing, color matrix processing and gamma processing on an input image converted to digital signals by the A/D conversion circuit 22, and then outputs the result. In a normal image output, the result obtained by the camera signal processor 202 is directly outputted through a signal line 207.

An input image holding section 203 holds input images to be supplied to the trajectory pixel frame selector 221 and the background pixel frame selector 222. Like the example of FIG. 4, it is assumed that n input images ($I_1$ to $I_n$) are being held. An input image storing section 205 stores input images supplied from the camera signal processor 202. When an image that is being captured is used as an input image, the input image holding section 203 holds, as the input image, the image supplied from the camera signal processor 202. When an image stored in the past is used as the input image, the input image holding section 203 reproduces the image stored in the input image storing section 205 and holds it as the input image.

A background image storing section 206 stores the background image held by the background image holding section 261. The background image storing section 206 temporarily stores the background image supplied from the background image holding section 261 through the signal line 208. Thereafter, the background image stored in the background image storing section 206 is reproduced as needed, and then held by the background image holding section 261. In other words, when a background image is created at the time of (particularly, immediately before) creating the trajectory composite image, the background image holding section 261 holds the background image supplied from the background creating section 231. On the other hand, when a background image stored in the past is used to create the trajectory composite image, the background image storing section 261 reproduces and holds a background image that is stored in the background image storing section 206.

The trajectory composite image outputted from the trajectory combiner 250 is held by the trajectory composite image holding section 270, and also supplied through the signal line 209 to the D/A conversion circuit 41 and the encoder/decoder 31, each being at the subsequent stage.

Figure 16:
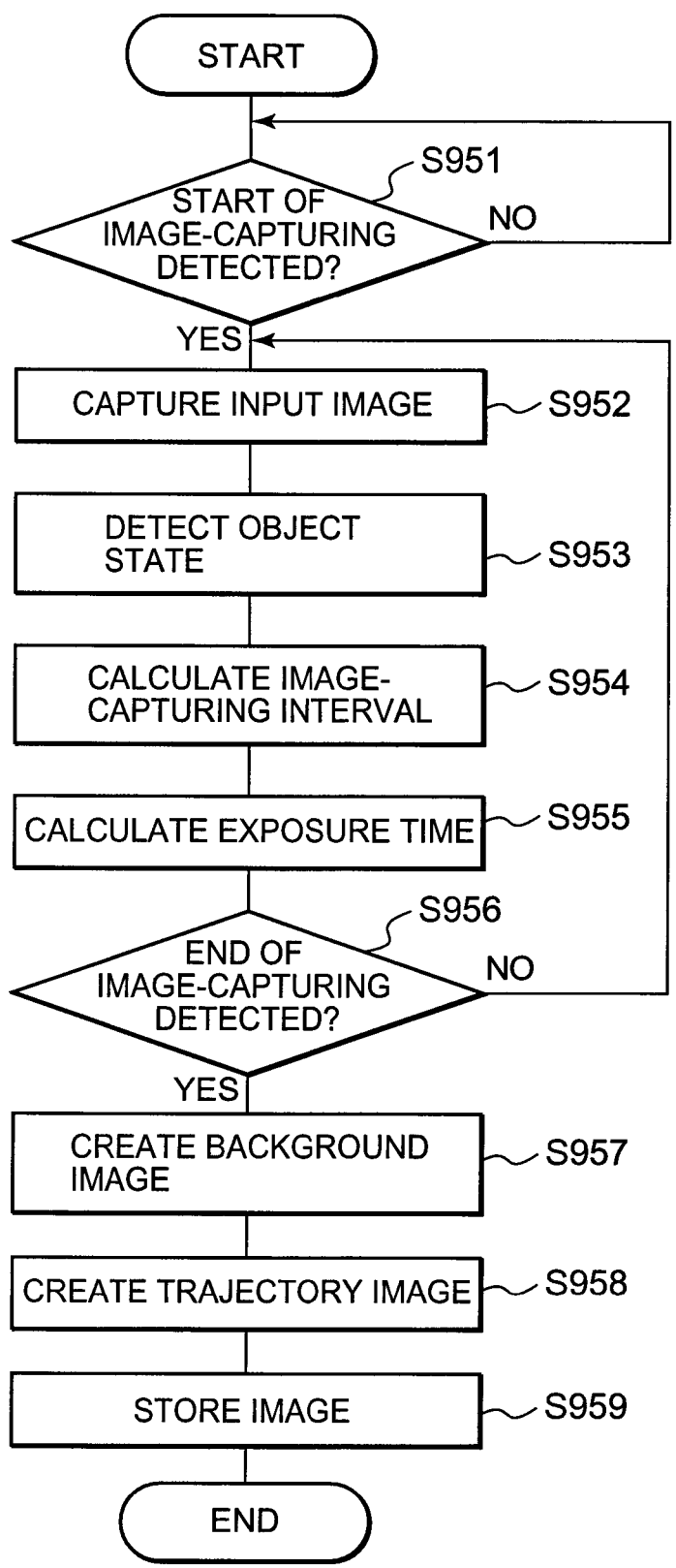
FIG. 16 is a flow chart showing an example of the processing procedure when the image capturing apparatus captures an image in the present embodiment.

FIG. 16 is a flowchart showing an example of the processing procedure when the image capturing apparatus captures an image in the present embodiment. First, when an image-capturing start detector 541 detects an image-capturing start (step S951), an input image is captured (step S952). At the time of the image-capturing, the object state detector 300 detects the state of an object (step S953). Depending on the state of the object, an image-capturing interval and exposure time are calculated (steps S954 and S955), and image-capturing control is performed based on the image-capturing interval and the exposure time.

The image-capturing operation will be repeated until the image-capturing end detector 542 detects an image-capturing end (step S956). The image-capturing end can be detected when the image-capturing operation accepting section 521 accepts the release of the pressed shutter button, or when the object state detector 300 detects that the object is in still.

The background image is created on termination of the image-capturing (step S957). In other words, as shown in FIG. 14, all of the frames to be used for creating the background are selected (step S941), and the background image is created using the selected frames (step S942).

Subsequently, the trajectory combiner 250 creates a trajectory composite image (step S958). The input image and the background image are also stored by the input image storing section 205 and the background image storing section 206, respectively (step S959). The background image stored in step S959 is reproduced when the trajectory composite image is being reproduced, and then held in the background image holding section 261.

While the foregoing embodiment has been shown herein and described as an example for embodying the present invention, which has correlations with specified matters in the appended claims, respectively, it will be understood that many changes and modifications may be made therein without departing from the scope of the present invention.

Specifically, in an embodiment of the present invention, the object state detecting means described in the section of "Summary of the Invention" corresponds to, for example, the object state detector 300. The image-capturing control means corresponds to, for example, the image-capturing controller 546. The image synthesis means corresponds to, for example, the trajectory generator 200.

In another embodiment of the present invention, the image selecting means corresponds to, for example, the background pixel frame selector 222. The background creating means corresponds to, for example, the background creating section 231. The background image holding means corresponds to, for example, the background image holding section 261. The output image holding means corresponds to, for example, the trajectory composite image holding section 270. The degree-of-difference generating means corresponds to, for example, the degree-of-difference generator 240. The output image synthesis means corresponds to, for example, the trajectory combiner 250.

In still another embodiment of the present invention, the start detecting means corresponds to, for example, the image-capturing start detector 541.

In still another embodiment of the present invention, the end detecting means corresponds to, for example, the image-capturing end detector 542.

In still another embodiment of the present invention, the object state detecting procedure corresponds to, for example, step S953. The calculation procedure corresponds to, for example, step S954 or S955. The image-capturing control procedure corresponds to, for example, step S952. The image combining procedure corresponds to, for example, step S958.

The processing procedure described in the foregoing embodiment may be regarded as a method having a series of these procedures. Alternatively, it may be regarded as a program for causing a computer to execute the series of these procedures, and a recording medium storing the program.

The present application contains subject matters related to Japanese Patent Application No. 2006-204319 filed in Japanese Patent Office on Jul. 27, 2006, the entire content of which being incorporated herein by reference.

It should be understood by those skilled in the art that various modifications, combinations, sub-combinations, and alterations may occur depending on design requirements and other factors insofar as they are within the scope of appended claims and equivalents thereof.

What is claimed is:

1. An image processing apparatus comprising:
    object state detecting means for detecting a state of an object in input images inputted in time series;
    image-capturing control means for controlling image-capturing of the input images in accordance with the detected state of the object, wherein the image-capturing control means controls an image-capturing interval and an exposure time based on the detected state of the object; and
    image combining means for combining pixel values at corresponding pixel positions of the input images, and outputting the pixel values as an output image, the input images being subject to image-capturing control by the image-capturing control means.

2. The image processing apparatus according to claim 1, wherein the output image is an image showing a trajectory of the object.

3. The image processing apparatus according to claim 1, wherein
    the image combining means include:
    image selecting means for selecting, as selection images, a predetermined number of input images from the input images;
    background creating means for creating, with respect to each of corresponding pixel positions of the selection images, a pixel value having a predetermined distribution in pixel values of the selection images, as a pixel value of a corresponding pixel position of a background image;
    background image holding means for holding pixel values of the background image;
    output image holding means for holding pixel values of the output image;
    degree-of-difference generating means for generating a degree-of-difference indicating a degree that the pixel values of the input images are different from the corresponding pixel values of the background image held by the background image holding means; and
    output image combining means for combining, with respect to the pixel values of the output image, pixel values at the corresponding pixel positions of the input images in accordance with the degree-of-difference, and holding as pixel values of a new output image in the output image holding means.

4. The image processing apparatus according to claim 1, wherein
    the object state detecting means detect a motion of the object as a state of the object; and
    the image-capturing control means calculate an image-capturing interval according to a speed of the detected motion of the object, and control the image-capturing based on the image-capturing interval.

5. The image processing apparatus according to claim 4, wherein
the image-capturing control means control the image-capturing interval such that the image-capturing interval decreases as the speed of the detected motion of the object increases.

6. The image processing apparatus according to claim 1, wherein
the object state detecting means detect a motion of the object as a state of the object; and
the image-capturing control means calculate an exposure time according to a speed of the detected motion of the object, and controls the image-capturing based on the exposure time.

7. The image processing apparatus according to claim 6, wherein
the image-capturing control means control the exposure time such that the exposure time decreases as the speed of the detected motion of the object increases.

8. The image processing apparatus according to claim 1, wherein the object state detecting means detect a motion of the object as a state of the object; and
the image-capturing control means perform control such that the input image is captured if the object moves, and that the image-capturing of the input image is stopped if the object does not move.

9. The image processing apparatus according to claim 8, further comprising:
start detecting means for detecting a designation of an image-capturing start position of the input image, wherein
the image-capturing control means perform control such that the input image is captured if the object moves after the image-capturing start position, and that the image-capturing of the input image is stopped if the object does not move.

10. The image processing apparatus according to claim 9, further comprising:
end detecting means for detecting a designation of an image-capturing end position of the input image, wherein
the image-capturing control means perform control such that the input image is captured if the object moves between the image-capturing start position and the image-capturing end position, and that the image-capturing of the input image is stopped if the object does not move.

11. An image processing method comprising:
detecting a motion of an object as a state of the object in input images inputted in time series;
calculating an image-capturing interval and exposure time according to a speed of the detected motion of the object;
controlling image-capturing of the input images based the image-capturing interval and the exposure time; and
outputting an output image by combining pixel values at corresponding pixel positions of the input images subjected to the image-capturing control.

12. A program embodied on a non-transitory computer readable medium causing a computer to execute:
an object state detecting procedure detecting a motion of an object as a state of the object in input images inputted in time series;
a calculation procedure calculating an image-capturing interval and exposure time according to a speed of the detected motion of the object;
an image-capturing control procedure controlling image-capturing of the input images based on the image-capturing interval and the exposure time; and
an image combining procedure for outputting an output image by combining pixel values at corresponding pixel positions of the input images subjected to the image-capturing control.

13. An image processing apparatus comprising:
an object state detector detecting a state of an object in input images inputted in time series;
an image-capturing controller controlling image-capturing of the input images in accordance with the detected state of the object, wherein the image-capturing controller controls an image-capturing interval and an exposure time based on the detected state of the object; and
an image combiner combining pixel values at corresponding pixel positions of the input images, and outputting the pixel values as an output image, the input images being subject to image-capturing control by the image-capturing controller.

* * * * *